J. C. POLE.
APPARATUS FOR TREATING LIQUIDS BY ULTRA-VIOLET RAYS.
APPLICATION FILED MAR. 28, 1916. RENEWED MAY 21, 1920.
1,367,090.
Patented Feb. 1, 1921.
2 SHEETS—SHEET 1.
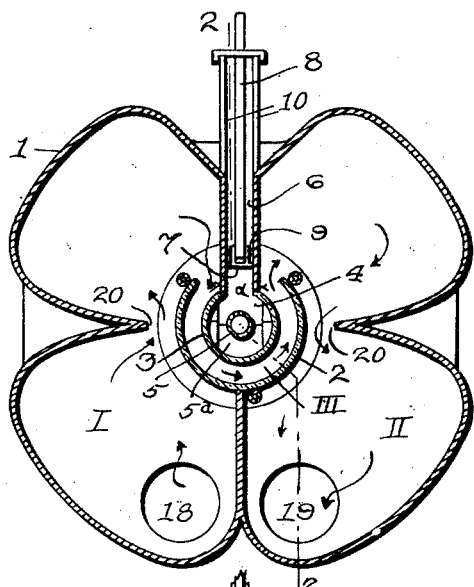
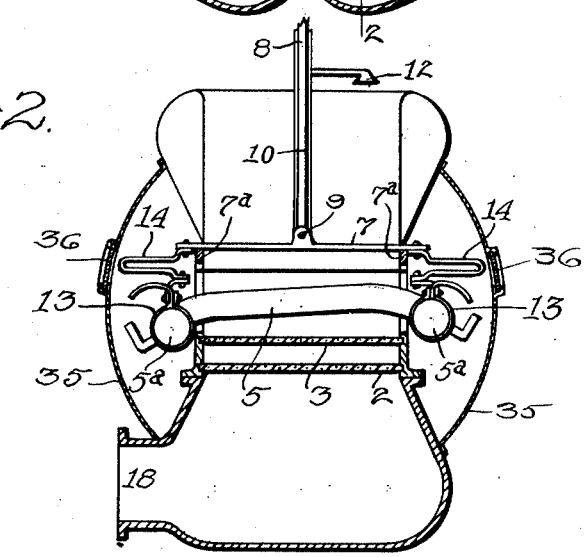
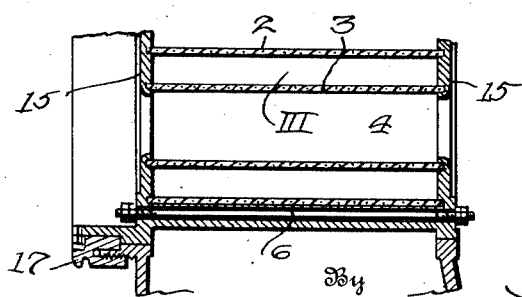
Inventor
Joseph C. Pole
By
Attorneys J. C. POLE.
APPARATUS FOR TREATING LIQUIDS BY ULTRA-VIOLET RAYS.
APPLICATION FILED MAR. 28, 1916. RENEWED MAY 21, 1920.
1,367,090.                                            Patented Feb. 1, 1921.
2 SHEETS—SHEET 2.
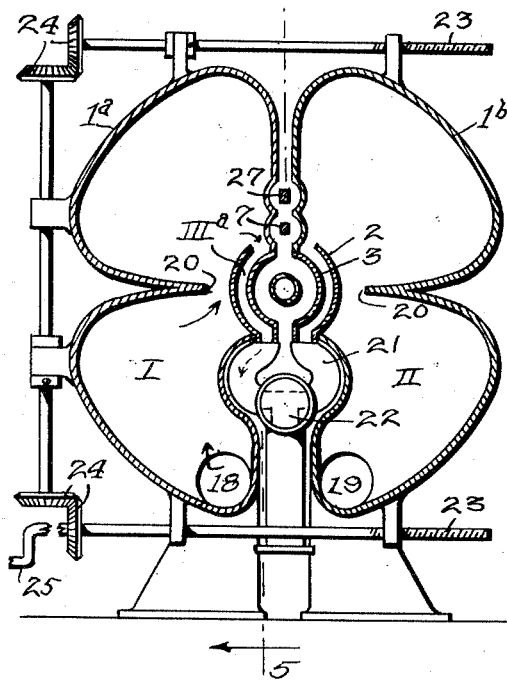
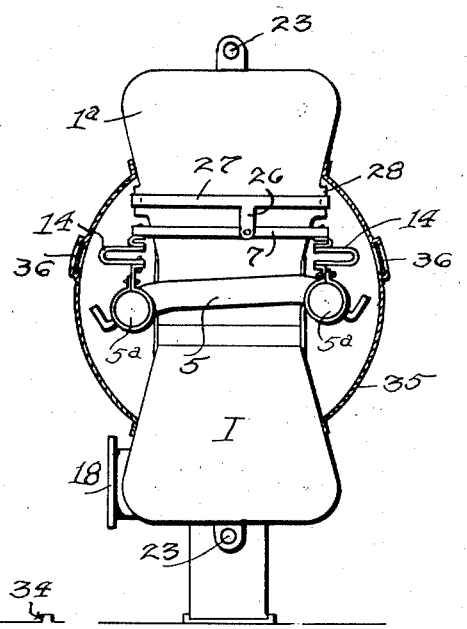
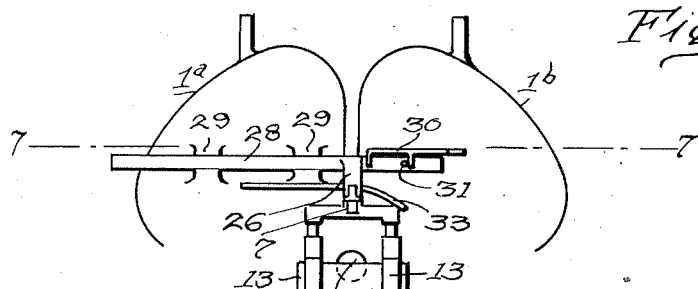
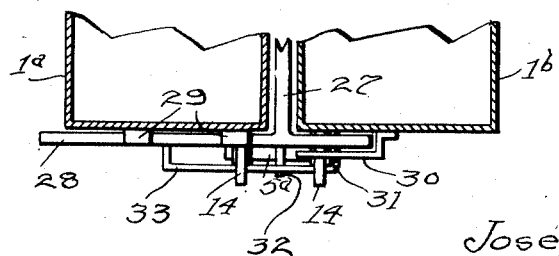
Inventor
Joseph C. Pole

UNITED STATES PATENT OFFICE.

JOSEPH CHARLES POLE, OF VIENNA, AUSTRIA, ASSIGNOR, BY MESNE ASSIGNMENTS, TO THE CHEMICAL FOUNDATION, INC., A CORPORATION OF DELAWARE.

APPARATUS FOR TREATING LIQUIDS BY ULTRA-VIOLET RAYS.

1,367,090.

Specification of Letters Patent.   Patented Feb. 1, 1921.

Application filed March 28, 1916, Serial No. 87,239. Renewed May 21, 1920. Serial No. 383,287.

*To all whom it may concern:*

Be it known that I, JOSEPH CHARLES POLE, subject of the Emperor of Austria, residing at Vienna, Austria, have invented certain new and useful Improvements in Apparatus for Treating Liquids by Ultra-Violet Rays, of which the following is a specification.

The present invention relates to an apparatus for the treating of liquids by ultra violet rays. Heretofore in the processes used for sterilizing liquids by ultra violet rays, it was necessary that the liquid to be exposed passed the source of ultra violet rays either in a thin layer or in a zigzag course near the source of rays. When the liquid to be treated is not perfectly transparent and a very thorough sterilizing is wanted, the last named process does not give good results, and the first mentioned process is by far more reliable, but such an apparatus is capable of only a small output.

According to the present invention the liquid is exposed to the ultra violet rays, firstly in a large container having various cross sectional areas. Then the liquid is passed through a narrow channel formed of quartz plates which are located in close proximity to the source of ultra violet rays so that a very efficient exposure may be had. And secondly, the liquid passes through another container also of varying cross sectional areas. The support for the lamp is so constructed that it may always remain in connection with the apparatus either when working or when in a position of rest. Provision is also made whereby the lamp may be readily removed from its operative position either for the purpose of starting, or for safe keeping during transportation of the apparatus. Automatic means is also provided whereby the lamp may be started when moved to and from its operative position.

Reference should now be had to the accompanying drawings in which—

Figure 1 represents a vertical section of an embodiment of the present invention;

Fig. 2 is a vertical section taken upon the line 2—2 of Fig. 1;

Fig. 3 is a detail view of the quartz channel construction;

Fig. 4 is a vertical section of another form of the present invention;

Fig. 5 is a vertical section taken upon the line 5—5 of Fig. 4;

Fig. 6 is a detail side elevational view of the lamp supporting means shown in Fig. 5, and Fig. 7 is a detail sectional view taken on the line 7—7 of Fig. 6.

The apparatus disclosed in Figs. 1 to 3 consists of a container 1 divided into a plurality of chambers I, II, communicating with each other by the narrow channel III composed of quartz plates 2 and 3. The inner wall 3 of the channel closes the aperture 4 of the container. Within the aperture 4 is placed the quartz lamp 5 which serves as a joint source of ultra violet rays for the chambers I and II and the channel III. The containers 1 and 2 are of varying cross section. By reason of the restricted passages 20 therein the liquid must pass in close proximity to the lamp 5. The container 1 is provided with the vertically extending slot 6 running from the outside down to the aperture 4 whereby the quartz lamp 5 may be introduced. In order that the penetration by the ultra violet rays of the liquid flowing through the channel III may be efficient, the round quartz plates 2 are positioned rather close to the lighting tube of the lamp and since the aperture 4 is of relatively small area, the lamp is removed therefrom through the slot 6 for the purpose of starting. The slot 6 through which the lamp is removed is of as narrow width as is practicable, so that the radiation of almost the whole circumference of the lamp tube is utilized for sterilizing purposes, except the small angle α. If it is so desired a reflecting medium may be positioned upon the lamp holder 7 for the purpose of reflecting the rays which would otherwise be wasted.

The lamp holder 7 is pivoted as at 9 to a connecting rod 8 which is adapted to move in the guideway 10. The spring 11 positioned between the holder 7 and the connecting rod 8 is adapted to maintain the lamp in narrow working position. 7ᵃ indicates shoulders upon which the holder 7 is adapted to rest when in operative position. When the lamp 5 is removed from the aperture 4 by means of the holder 7 and the connecting rod 8, the holder abuts the projection 12 secured to the guide 10 and tilts the lamp in a manner to start the same. The lamp is then lowered into its operative position.

The terminals 5ᵇ of the lamp 5 are mounted in removable clamps 13 which are in turn secured to one end of the springs 14. The other end of the springs 14 are in turn secured to the holder 7. This construction insures the lamp against damage either by jarring or vibration. This construction also permits the lamp to be withdrawn from the aperture 4 and the slot 6 as is ofttimes desirable during transportation of the device.

The circular quartz plates 2 and 3 which form the channel III are rabbited in metallic disks 15 (Fig. 3) which are held together by means of the stay bolts 16. By this construction it is a simple matter to interchange any of the assembled parts. This construction also makes it possible to remove the entire central unit (consisting of quartz plates 2 and 3, end disks 15, and stay bolts 16) from the container 1, the joint between the central unit and the container 1 being preferably a conical ground joint maintained in position by the nut 17. While the quartz plates are spoken of as being mounted concentrically, they may be mounted slightly eccentrically, if so desired, and when so mounted it is preferable to have the narrower portion of the channel upon the outlet side.

The raw liquid to be treated enters the chamber I at 18, flows through the channel III in a wide thin stream, passes into the chamber II and issues as a treated liquid at 19. During the course of the liquid during treatment a great part of the microbes are destroyed in chamber I by the action of the ultra violet rays. The contraction 20 aids in mixing the water thoroughly so that parts of the liquid which were at one time farther from the lamp, where they received a lesser amount of treatment relative to the liquid adjacent the lamp, are brought closer to the lamp. The liquid then enters the channel III where the sterilization is made as near perfect as is possible. The liquid then enters the chamber II where like chamber I the velocity of the water is greatly reduced and another mixing is imparted to it which tends to destroy any remaining germs or microbes.

According to the construction shown in Figs. 4 to 7, inclusive, the chamber I of Fig. 1 is divided into two sections, 1ª and 1ᵇ, which are coupled together and have a joint source of light. This construction is very desirable since it is possible to connect the apparatus in series when a rather opaque liquid is to be treated, and whereby the device may be connected in multiple when the liquid to be treated is relatively transparent. The chambers I and II are connected by a flexible conduit 21 under the control of the two-way valve 22 which is used for connecting the chamber I and II, either in series or in multiple as hereinbefore stated. When the valve 22 is set so that the apparatus is to be used in series, the liquid enters at 18, passes through chamber I, quartz channel IIIª, conduit 21, valve 22, quartz channel IIIᵇ, chamber II and flows out a treated liquid at 19. When the valve 22 is set as shown in the drawing the liquid enters chamber I at 18, passes through channel IIIª and leaves the apparatus a sterilized liquid through the valve 22: likewise the liquid enters chamber II at 19, passes through quartz channel IIIᵇ and out through the valve 22.

Preferably one of the containers 1ª, 1ᵇ is movable in order to give access to the lamp for starting and to be separated from the lamp during transportation. The increase of space between the lamp and the adjoining quartz walls may be had either by moving both the parts 1ª and 1ᵇ in opposite directions, or as shown here, by maintaining the part 1ª fixed and slidably positioning the part 1ᵇ. In order that the part 1ª may be readily moved, the screws 23 are provided which are so connected as to be rotated in unison by the beveled gears 24. A crank 25 is also provided for convenience of operation.

In the construction shown in Figs. 4 to 7, inclusive, it is preferable to mount the lamp 5 in the holder 7 in the same manner as that shown in Figs. 1 to 3. The holder 7 is pivoted to an arm 26 depending from the cross piece 27 which has its parallel ends 28 positioned within the guides 29 upon the container 1ª. Secured to the container 1ᵇ is a forked stop 30 having depending prongs between which a pin 31 secured to the parallel arms 28 is adapted to be positioned. By this construction it is obvious that as the container 1ᵇ is moved into working position by means of the crank 25 and the screws 23, the lamp 5 will be automatically positioned with respect to the containers 1ª and 1ᵇ, and upon the container 1ᵇ being drawn away from the container 1ª the lamp 5 will be automatically spaced equal distance between the two containers. Secured to the container 1ª is a cam way 33 which is adapted to abut a part of the lamp holder 7 in a manner to tilt and start the same by the relative movement of the container 1ᵇ to the container 1ª. A stop 34 is provided for limiting the output movement of the container 1ᵇ.

For protecting the terminals 5ª of the lamp, located outside of the container, the coverings 35 are provided having small windows 36.

I claim:—

1. An apparatus for treating liquids by ultra violet rays comprising a plurality of containers provided with passages of varying cross sectional areas and a narrow channel of a material transmitting ultra violet rays, and an electric lamp for supplying the said rays positioned adjacent the containers, said lamp being a joint source of rays for the containers and the said channel.

2. An apparatus for treating liquids by ultra violet rays comprising a quartz lamp, a container for guiding the liquid to be treated past said lamp consisting of a narrow channel of material transmitting ultra violet rays concentrically surrounding said lamp and a plurality of chambers of different cross sectional areas, a wall dividing the chambers into two parts, one part receiving the raw liquid, the other part receiving the treated liquid, said first and second parts being connected together by said narrow channel.

3. An apparatus for treating liquids by ultra violet rays having a quartz lamp as a source of ultra violet rays, a container for the liquid to be treated said container having a central unit provided with a channel of plates of material transmitting ultra violet rays, the said unit comprising plates positioned by disks having stay bolts connecting said plates and maintaining the plates in predetermined relation; said unit being provided with a ground surface and adapted to fit a complemental ground surface in the said container.

4. An apparatus for treating liquids by ultra violet rays having an electric lamp as a source of ultra violet rays, comprising a container for guiding the liquid to be treated said container consisting of a plurality of independent parts each having a narrow channel of quartz glass said parts being connected by conduits, said lamp being when in its working position closely surrounded by all parts of the container.

5. An apparatus for treating liquids by ultra violet rays comprising an electric lamp as a source of said rays, a container for guiding the liquid to be treated, said container consisting of two independent parts, each part having a separate and distinct narrow channel of quartz glass in close proximity to said lamp, said lamp being in its working position in the approximate center of said container and immediately adjacent said narrow channels.

6. An apparatus for treating liquids by ultra violet rays having an electric lamp as a source of ultra violet rays comprising a container for guiding the liquid to be treated, said container consisting of a plurality of independent parts each having a narrow channel of quartz glass said parts being connected by conduits, said lamp being when in its working position closely surrounded by all parts of the container, and means being provided for moving the parts from each other and from said lamp in order to attain access to the said lamp.

7. An apparatus for treating liquids by ultra violet rays comprising a quartz lamp as a source of said rays, a holder for said lamp, means for moving and tilting said holder and lamp, a container for guiding the liquid to be treated, said container comprising a plurality of parts connected by conduits and when in working position closely surrounding said lamp, means for moving the parts of said container away from said lamp, and means for automatically moving said lamp when the parts of said container are moved away.

In testimony whereof I affix my signature in presence of two witnesses.

JOSEPH CHARLES POLE.

Witnesses:
RICHARD KOMINIK,
AUGUST FUGGER.